(12) United States Patent
Choi et al.

(10) Patent No.: US 8,371,628 B2
(45) Date of Patent: Feb. 12, 2013

(54) LENGTH-VARIABLE SHOCK ABSORBING APPARATUS FOR VEHICLE

(75) Inventors: Seibum Choi, Daejeon (KR); Hyo Min Jin, Daejeon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 303 days.

(21) Appl. No.: 12/654,329

(22) Filed: Dec. 17, 2009

(65) Prior Publication Data

US 2011/0042976 A1  Feb. 24, 2011

(30) Foreign Application Priority Data

Aug. 19, 2009  (KR) .................. 10-2009-0076822

(51) Int. Cl.
*B60R 19/26* (2006.01)
(52) U.S. Cl. .................... 293/133; 293/132; 296/187.09
(58) Field of Classification Search ............. 296/187.03, 296/187, 4, 187.09; 293/117, 118, 155, 105, 293/119, 50, 45, 148, 145, 132, 133; 180/274; 188/371; *B60R 19/04*
See application file for complete search history.

(56) References Cited

U.S. PATENT DOCUMENTS

| | | | | | |
|---|---|---|---|---|---|
| 1,418,453 | A | * | 6/1922 | O'Brien | 293/131 |
| 2,144,357 | A | * | 1/1939 | Booharin | 293/136 |
| 2,916,324 | A | * | 12/1959 | Graham | 296/187.03 |
| 3,198,543 | A | * | 8/1965 | Presunka | 280/751 |
| 3,729,221 | A | * | 4/1973 | Granig | 293/9 |
| 3,771,824 | A | * | 11/1973 | Applegate | 293/131 |
| 3,774,950 | A | * | 11/1973 | Weller | 293/131 |
| 3,834,686 | A | * | 9/1974 | Moritz et al. | 267/116 |
| 4,518,183 | A | * | 5/1985 | Lee | 293/118 |
| 5,697,657 | A | * | 12/1997 | Unrath, Sr. | 293/118 |
| 6,019,419 | A | * | 2/2000 | Browne et al. | 296/187.1 |
| 6,062,355 | A | * | 5/2000 | Nohr et al. | 188/374 |
| 6,174,009 | B1 | * | 1/2001 | McKeon | 293/133 |
| 6,179,355 | B1 | * | 1/2001 | Chou et al. | 293/132 |
| 6,302,458 | B1 | * | 10/2001 | Wang et al. | 293/132 |
| 6,536,818 | B1 | * | 3/2003 | Moss | 293/134 |
| 6,702,345 | B1 | * | 3/2004 | Yoshida | 293/133 |
| 6,709,035 | B1 | * | 3/2004 | Namuduri et al. | 293/118 |
| 6,910,714 | B2 | * | 6/2005 | Browne et al. | 280/753 |
| 7,192,079 | B2 | * | 3/2007 | Schramm et al. | 296/187.04 |
| 7,229,124 | B2 | * | 6/2007 | Luik et al. | 296/187.05 |
| 7,357,445 | B2 | * | 4/2008 | Gross et al. | 296/187.09 |
| 7,393,030 | B2 | * | 7/2008 | Steeg et al. | 293/133 |
| 7,416,043 | B2 | * | 8/2008 | Pipkorn et al. | 180/274 |
| 7,909,373 | B2 | * | 3/2011 | Donovan | 293/119 |

* cited by examiner

*Primary Examiner* — Glenn Dayoan
*Assistant Examiner* — Pinel Romain
(74) *Attorney, Agent, or Firm* — Bacon & Thomas, PLLC

(57) ABSTRACT

Disclosed is a length-variable bumper capable of adjusting the length of a vehicle body to lengthen a time interval over which momentum changes upon collision. The length-variable bumper includes a bumper member primarily absorbing collision energy, a collision energy absorbing member foldable in a longitudinal direction, and an operation unit configured to transit the collision energy absorbing member to an unfolded state when a vehicle speed is a predetermined level or more and to transit the collision energy absorbing member to a folded state when the vehicle is the to predetermined level or less. The collision energy absorbing member has one end connected to a frame of the vehicle and the other end connected to the bumper member and configured to be deformed upon collision to secondarily absorb the collision energy.

8 Claims, 8 Drawing Sheets

LENGTH-VARIABLE SHOCK ABSORBING APPARATUS FOR VEHICLE

CROSS-REFERENCE TO RELATED APPLICATION

This application claims the benefit of Korean Patent Application No. 10-2009-0076822, filed on Aug. 19, 2009, the disclosure of which is hereby incorporated herein by reference in its entirety.

BACKGROUND OF THE INVENTION

1. Field of the Invention

The present invention relates to a length-variable shock absorbing apparatus for a vehicle, and more particularly, to a length-variable shock absorbing apparatus for a vehicle capable of lengthening the length of a bumper in a longitudinal direction of a vehicle to form a space for absorbing collision energy upon collision of the vehicle to secure safety of a driver when a vehicle speed is more that a predetermined level, and reducing the length of the bumper in the longitudinal direction of the vehicle to readily park the vehicle when the vehicle speed is lower than the predetermined level, and a vehicle employing the same.

2. Description of the Related Art

In the recent automobile industries, safety regulations for protection of drivers from collisions of vehicles have been further strengthened. There are laws related to automobile safety standards, and the standards have become stricter with development of automobile technologies. Automobile makers are establishing stricter internal standards to compete with other makers, independently from the laws.

Such automobile safety apparatus may be generally classified into equipment for preventing occurrence of accidents themselves and equipment for protecting drivers in the case of accidents.

In recent times, most automobiles are equipped with electronic control devices for preventing traffic accidents. While the prevention of accidents is the best way of protecting drivers, it is impossible for such apparatus to completely prevent accidents. In addition, such apparatus cannot protect the drivers in the case of accidents. For this reason, various equipment of reducing injury to drivers have been developed.

Impulse is change in momentum, and is in proportion to a time interval over which a force is applied. Therefore, when the same impulse is applied, a magnitude of a force is in reverse proportion to a time interval over which the force is applied. That is, if a vehicle collides at a high speed, since change in momentum is large, the magnitude of the force applied to a passenger increases. Therefore, when a vehicle is designed such that a deformation section of the vehicle becomes longer when the vehicle collides at a high speed, the length of a collision energy absorbing section may increase to relatively reduce the force applied to the passenger. On the other hand, since impulse is small when a vehicle collides at a low speed, the length of the collision energy absorbing section may be reduced to consider both driving performance and parking convenience.

For example, safety belts, airbags, etc., can protect drivers when vehicles collide. These equipment functions to increase a time interval over which a shock is absorbed to instantly reduce the force applied to the passenger. However, in the case of a small-sized vehicle having a relatively short length, even when the vehicle is provided with the equipment, it is difficult for the vehicle to substantially reduce impulse due to its structural disadvantages as compared with a mid-or large-sized vehicle. In particular, when the small-sized vehicle collides at a high speed, change in acceleration is very large and a time interval for dissipating the colliding energy is insufficient, increasing probability of injury to the passenger.

In order to solve the problems, various researches have been performed to improve the structures of vehicles to effectively absorb collision energy or employ novel energy absorbing materials. In relation to improvement of the vehicle structure, a bumper that can project immediately before collision may be used. However, the bumper may project even when there is no collision, possibly causing traffic accidents. Moreover, a hydraulic or pneumatic bumper is very expensive and heavy.

SUMMARY OF THE INVENTION

The present invention, therefore, solves aforementioned problems associated with conventional devices by providing a length-variable shock absorbing apparatus, which is light and inexpensive, capable of projecting a bumper to form a space for absorbing collision energy upon high speed collision when a vehicle is running at a predetermined speed or more, and retracting the bumper when the vehicle is running at a predetermined speed or less, thereby forming a collision energy absorbing space depending on the vehicle speed.

In an exemplary embodiment of the present invention, there is provided a length-variable shock absorbing apparatus for a vehicle comprising: a bumper member disposed in the front of a vehicle and primarily absorbing collision energy upon collision; a collision energy absorbing member foldable in a longitudinal direction thereof, having one end connected to a frame of the vehicle and the other end connected to the bumper member, and configured to be deformed upon collision to secondarily absorb the collision energy; and an operation unit configured to transit the collision energy absorbing member to an unfolded state when a vehicle speed is a predetermined level or more and to transit the collision energy absorbing member to a folded state when the vehicle is the predetermined level or less.

The collision energy absorbing member may have grooves longitudinally disposed at predetermined intervals to be entirely collapsed upon collision.

The collision energy absorbing member have a cross-sectional area of a portion connected to the bumper member smaller than that of a portion connected to the vehicle frame, and a linear surface with no step in a longitudinal direction thereof.

The operation unit may include: a motor; a screw disposed at the vehicle frame in a longitudinal direction of the vehicle and driven by the motor; a linear member projecting from the vehicle frame or retracting toward the vehicle frame by the screw; and a connection member having one end connected to a side surface of the linear member and the other end connected to the collision energy absorbing member to push the collision energy absorbing member to be unfolded when the linear member projects and pull the colliding member absorbing member to be folded when the linear member retracts.

The linear member may have grooves longitudinally disposed at predetermined intervals to be entirely collapsed upon collision.

The linear member may have a cross-sectional area of a portion connected to the bumper member smaller than that of a portion connected to the vehicle frame.

The collision energy absorbing member may have a front end coupled to the bumper member and a rear end coupled to the vehicle frame, the front end being longer than the rear end such that the front end and the rear end forms a predetermined angle to obtain a predetermined space between the bumper member and the frame when the collision energy absorbing member is folded, enhancing absorption of collision energy upon low speed collision.

BRIEF DESCRIPTION OF THE DRAWINGS

The above and other features of the present invention will be described in reference to certain exemplary embodiments thereof with reference to the attached drawings in which.

DETAILED DESCRIPTION OF THE INVENTION

The present invention will now be described more fully hereinafter with reference to the accompanying drawings, in which preferred embodiments of the invention are shown.

Figure 1:
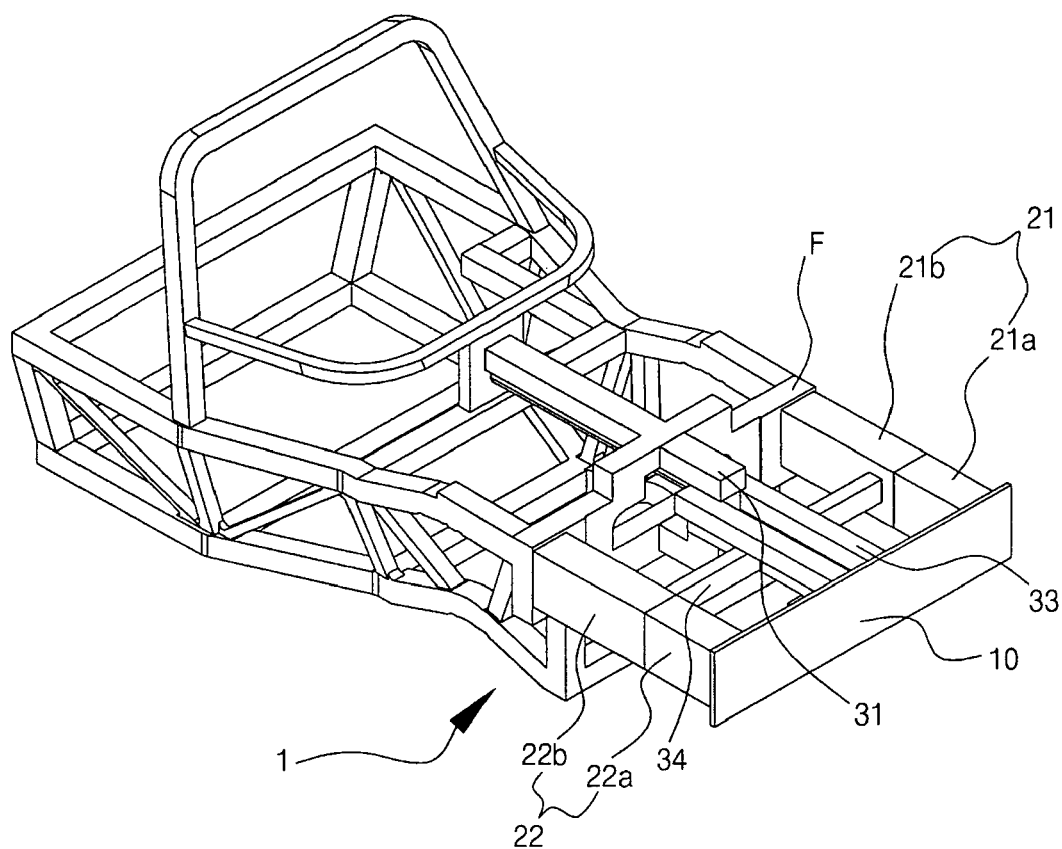
FIG. 1 is a perspective view of a length-variable bumper in accordance with an exemplary embodiment of the present invention.
Figure 2:
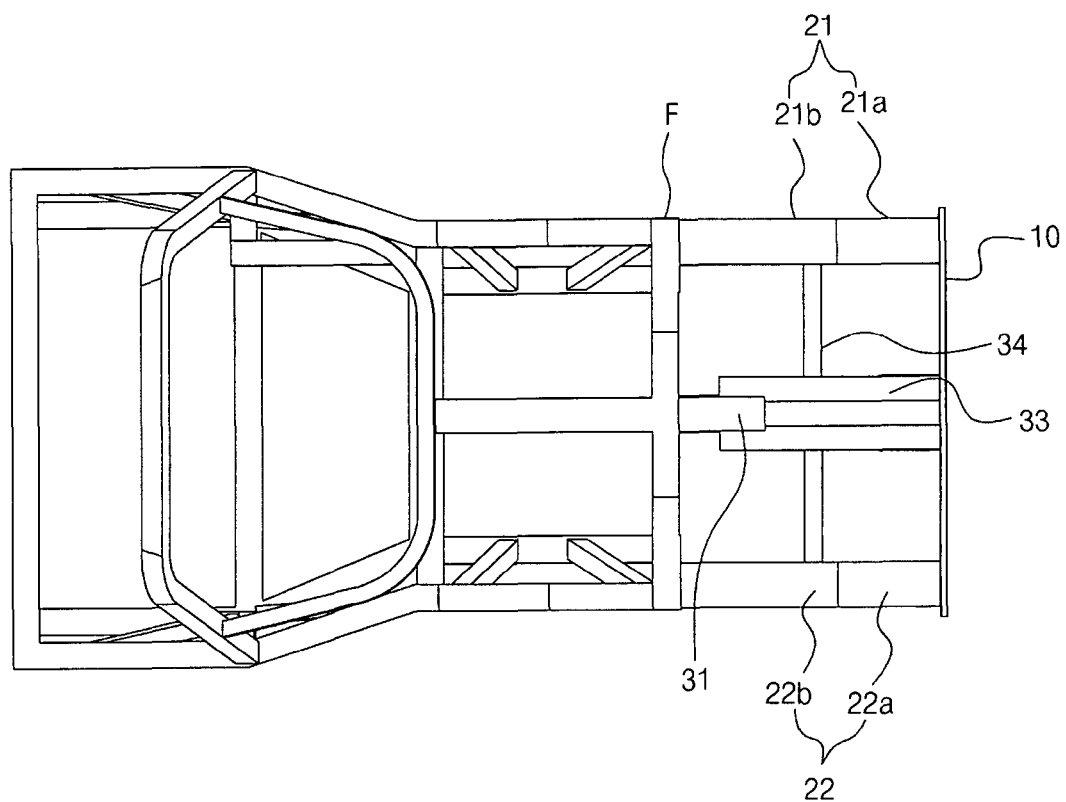
FIG. 2 is a plan view of the length-variable bumper in accordance with the exemplary embodiment of the present invention shown in FIG. 1.
Figure 3:
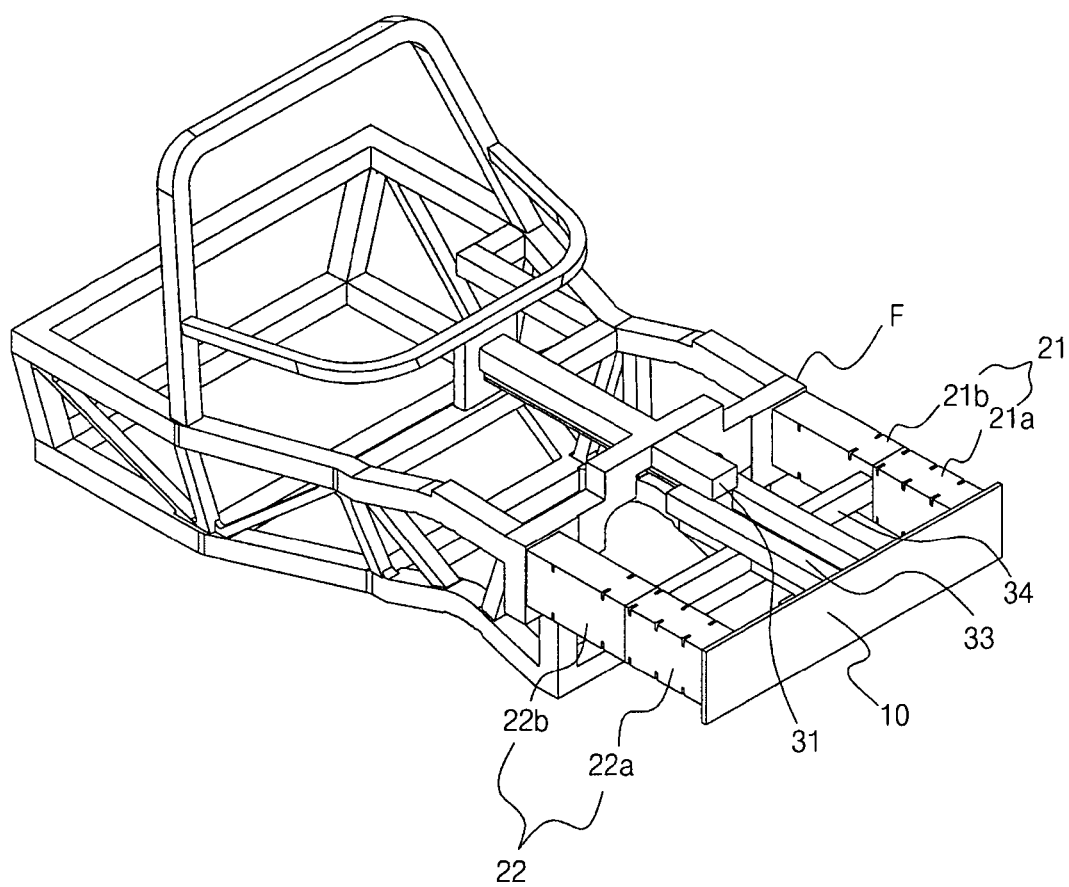
FIG. 3 is a perspective view of the length-variable bumper in accordance with the exemplary embodiment of the present invention having grooves formed in a folded collision energy absorbing member at predetermined intervals.
Figure 4:
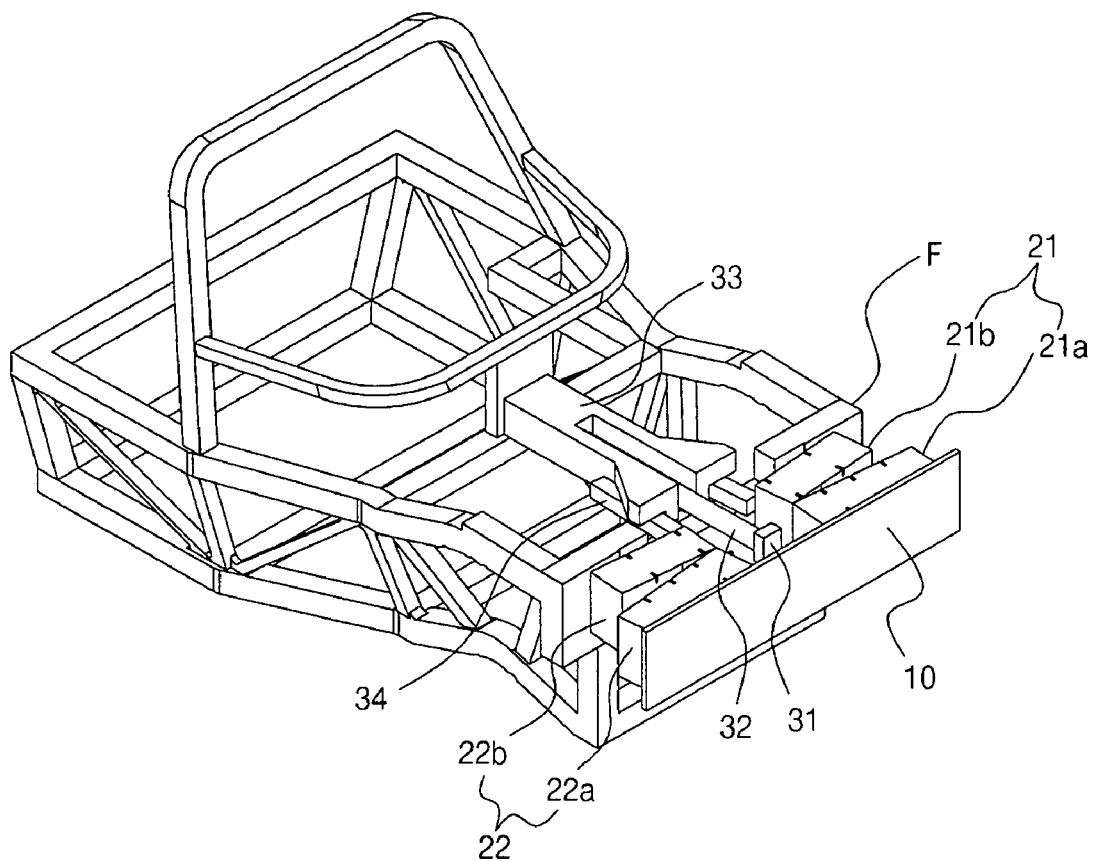
FIG. 4 is a perspective view of the length-variable bumper in accordance with the exemplary embodiment of the present invention having grooves formed at an unfolded collision energy absorbing member at predetermined intervals.
Figure 5:
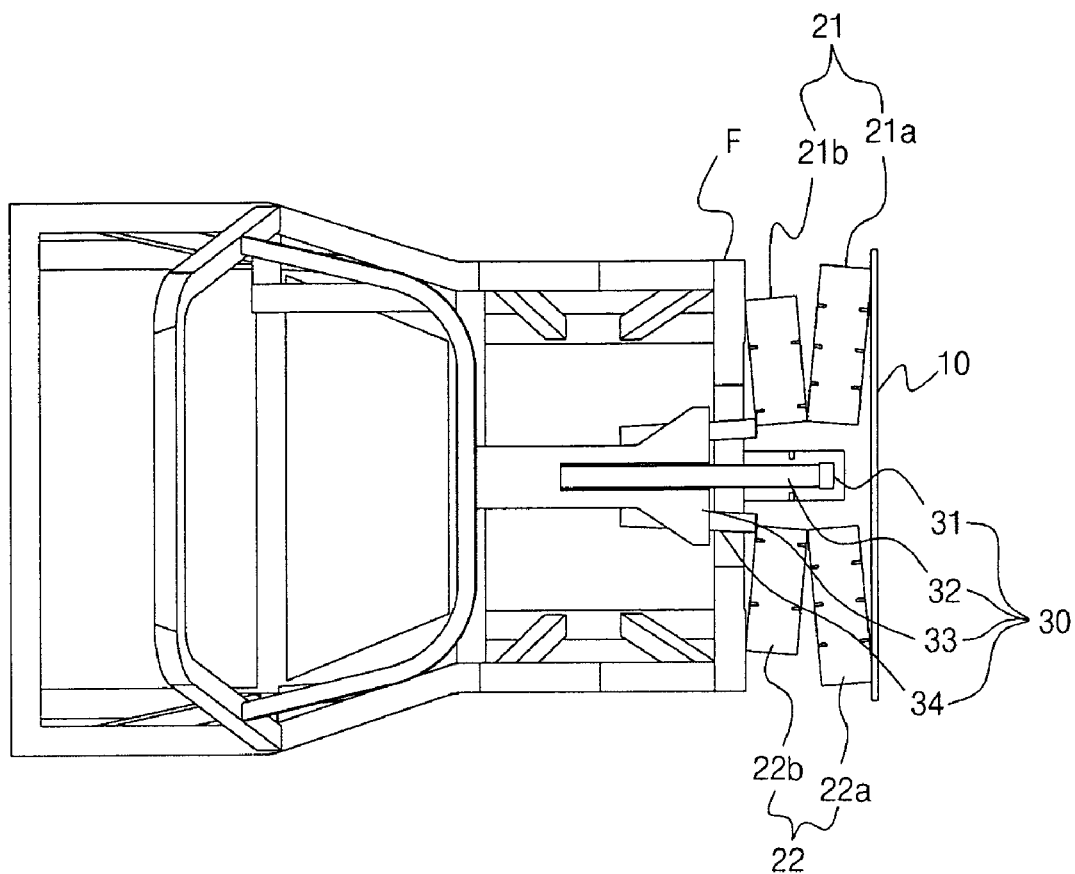
FIG. 5 is a plan view of the length-variable bumper in accordance with the exemplary embodiment of the present invention shown in FIG. 4.

FIG. 1 is a perspective view schematically showing a frame of a vehicle to which a length-variable shock absorbing apparatus for a vehicle in accordance with an exemplary embodiment of the present invention is mounted. FIG. 2 is a plan view of the frame of a vehicle shown in FIG. 1. FIG. 3 is a perspective view of a folded collision energy absorbing member 20 having grooves formed at predetermined intervals; FIG. 4 is a perspective view of the unfolded collision energy absorbing member 20 of FIG. 3. FIG. 5 is a plan view of the length-variable bumper in which the shock absorbing member 20 shown in FIG. 4 is folded.

Referring to FIG. 1, the length-variable shock absorbing apparatus for a vehicle in accordance with an exemplary embodiment of the present invention includes a bumper member 10, a collision energy absorbing member 20, and an operation unit 30.

In the length-variable shock absorbing apparatus for a vehicle in accordance with the exemplary embodiment of the present invention, the length of the collision energy absorbing member 20 is maximized when a vehicle speed reaches a predetermined speed, which may cause a certain level of impulse or more. That is, the length of the vehicle increases by substantially the length of the collision energy absorbing member 20. In this state, when head-on collision between vehicles or between a vehicle and an object occurs, the collision energy absorbing member 20 fixed to a frame F is deformed to absorb collision energy, remarkably reducing the collision energy transmitted to the vehicle body.

Figure 6:
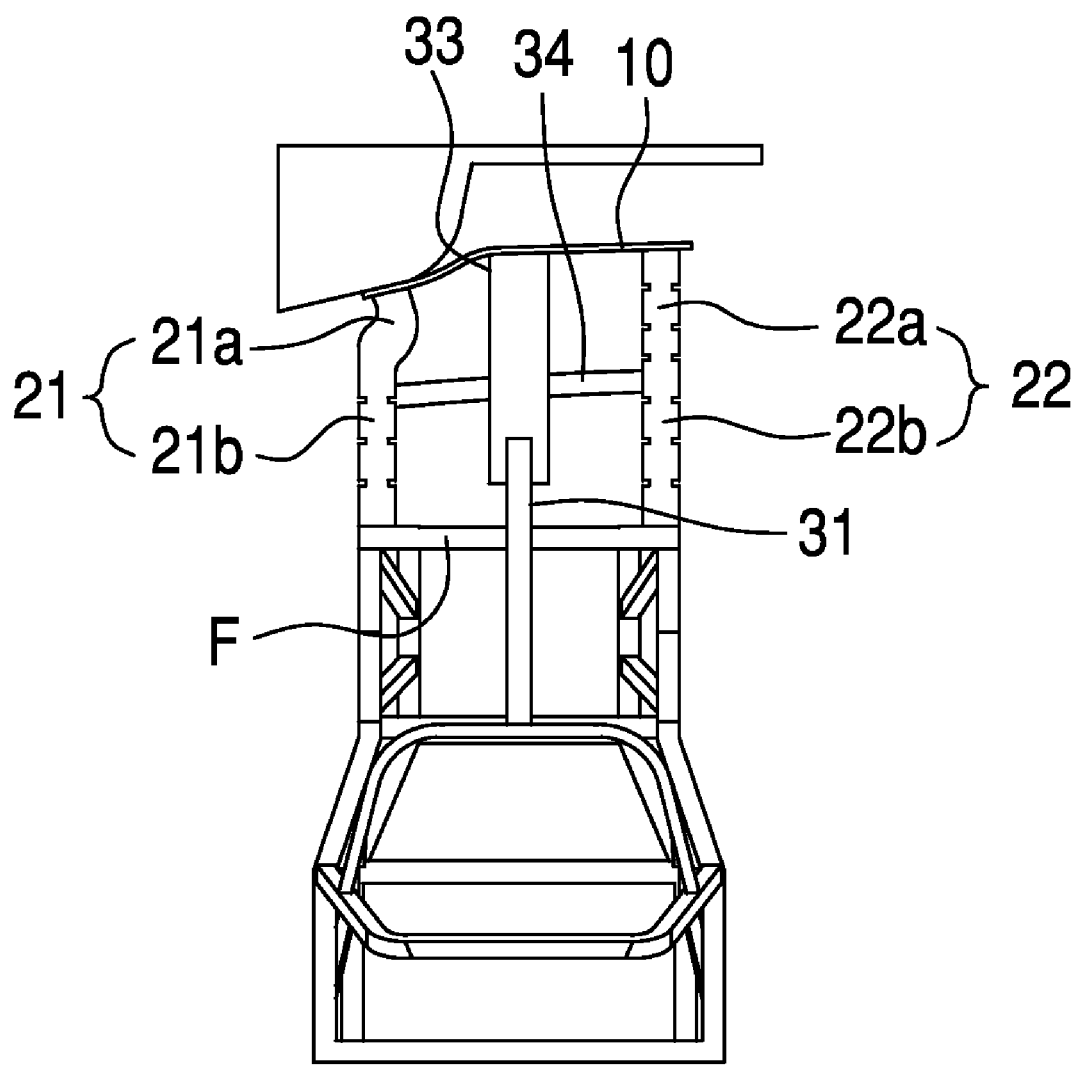
FIG. 6 is a plan view showing a collision state in which the unfolded collision energy absorbing member is in an offset state.
Figure 7:
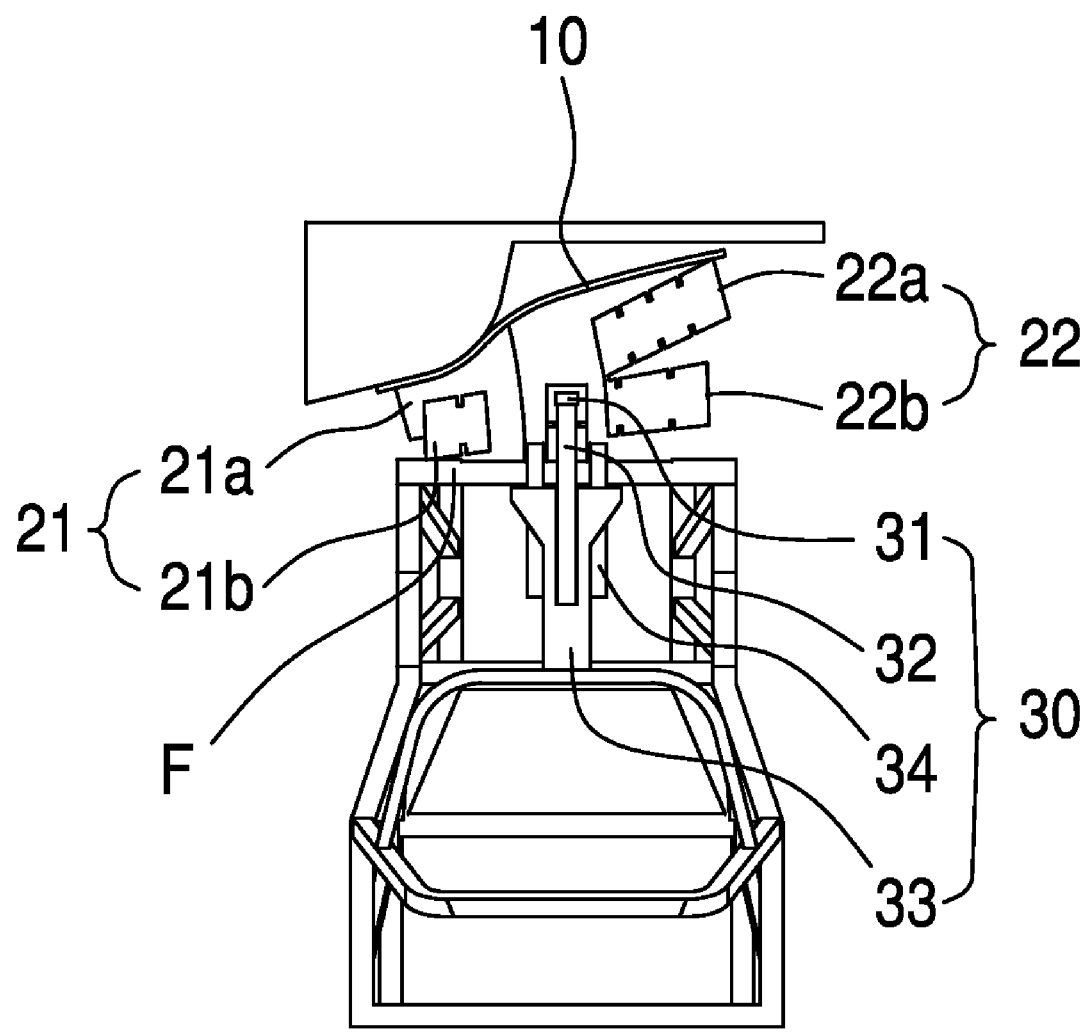
FIG. 7 is a plan view showing a collision state in which the folded collision energy absorbing member is in an offset state.
Figure 8:
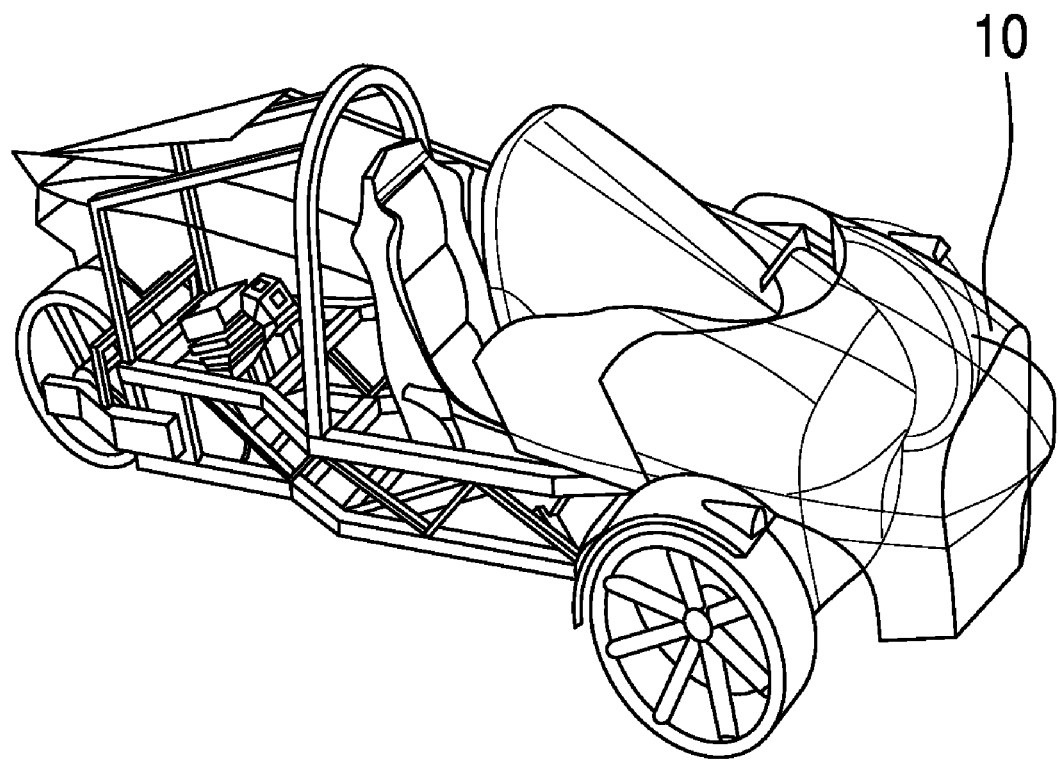
FIG. 8 is a perspective view of a vehicle on which the length-variable bumper is mounted.

The buffer member 10 shown in FIGS. 1 to 8 is disposed in the front of the vehicle. The buffer member 10 contacts with an object first upon collision of the vehicle. The bumper member 10 is formed of a material, which is light and can absorb shocks, and absorbs all collision energy when a fender bender occurs. While the bumper member is shown as a plate shape in FIG. 1, the bumper member may surround the entire length-variable bumper as shown in FIG. 8.

As shown in FIGS. 1 and 3, the collision energy absorbing member 20 is disposed between the bumper member 10 and the frame F. In this embodiment, the collision energy absorbing member 20 includes two beam members 21 and 22 extending along a longitudinal direction of the vehicle. The respective beam members 21 and 22 are formed of a light and rigid material. While the beam members 21 and 22 have a rectangular column shape, they may have, although not limited thereto, a cylindrical column shape, a polygonal column shape, etc., which may function as a support between the bumper member 10 and the frame F. Each beam member 21 or 22 is configured to connect the front member and the rear member via a hinge, etc., such that the front member and the rear member can be foldable in the longitudinal direction of the vehicle. One ends of front members 21a and 22a are connected to the bumper member 10 via hinges, etc., and ends of rear members 21b and 22b are rotatably connected to the frame F via hinges, etc.

The respective beam members 21 and 22 of the collision energy absorbing member 20 may have grooves formed at predetermined intervals in a longitudinal direction thereof. As described above, since the collision energy absorbing member 20 is entirely collapsed upon collision, the collision energy is substantially absorbed by the collision energy absorbing member 20 to reduce the collision energy transmitted to the frame F.

The respective beam members 21 and 22 of the collision energy absorbing member 20 have a cross-sectional area connected to the bumper member 10 larger than that connected to the frame F. The cross-sectional area may be continuously varied from a portion of each beam member 21 and 22 connected to the frame F to a portion thereof connected to the bumper member 10. As a result, the front portions of the beam members 21 and 22 are more effectively deformed than the rear portions thereof so that the collision energy absorbed by the collision energy absorbing member 20 increases to reduce the collision energy transmitted to the vehicle body.

As shown in FIG. 5, the operation unit 30 for controlling movement of the collision energy absorbing member 20 includes a motor 31, a screw 32, a linear member 33 and a connection member 34.

The screw 32 is installed in the frame F of the vehicle. The motor 31 is operated to rotate the screw 32. The motor 31 is controlled by a signal of an external control terminal configured to read change in vehicle speed. The external control terminal drives the motor 31 to lengthen the length-variable shock absorbing apparatus when a vehicle speed is a predetermined level or more, and drives the motor to shorten the length-variable shock absorbing apparatus when the vehicle speed is the predetermined level or less. The signal from the external control terminal increases a speed limit range of a conventional vehicle speed sensor or reads change in acceleration to prevent malfunction of the apparatus due to slide movement, etc., when the vehicle runs on a bad road surface caused by rain or snow. When the speed sensor, which is set as described above, detects that the vehicle speed is the predetermined level or more, the motor 31 is operated to drive the screw 32 so that the linear member 33 moves forward or rearward.

As shown in FIGS. 1 and 2, the linear member 33 is coupled to the screw 32 to reciprocate forward and rearward depending on a rotational direction of the screw 32.

The linear member 33 may be formed of a light and rigid material. In addition, the linear member 33 may have grooves formed at predetermined intervals in a longitudinal direction thereof to perform a collision energy absorbing function together with the collision energy absorbing member 20, or may have a trapezoidal structure so that the front part can be readily deformed to effectively absorb collision energy.

As shown in FIGS. 1 and 6, the connection member 34 completely restrains the linear member 33 and the respective beam members 21 and 22 of the collision energy absorbing member 20 when the linear member 33 is completely moved forward. The linear member 33 and the respective beam members 21 and 22 of the collision energy absorbing member 20 completely restrained by the connection member 34 are not pushed upon collision.

As shown in FIGS. 2 and 5, one end of the connection member 34 is rotatably connected to a side surface of the linear member 33. The opposite end of the connection member 34 is also rotatably connected to the collision energy absorbing member 20. As a result, when the screw 32 moves the linear member 33 forward, the connection member 34 gradually forms an included angle from a state parallel to the linear member 33. As the included angle increases, the connection member 34 pushes the collision energy absorbing member 20 to form a certain space in the front of the vehicle. At this time, the linear member 33 and the respective beam members 21 and 22 of the collision energy absorption member 20 are parallel to each other, and the connection member 34 is perpendicularly disposed therebetween. In this state, the connection member 34 supports the linear member 33 and the respective beam members 21 and 22 of the collision energy absorbing member 20. On the contrary, when the linear member 33 is moved backward, the connection member 34 perpendicular to the respective beam members 21 and 22 of the collision energy absorbing member 20 is also moved backward. The connection member 34 is returned back to its original state to fold the respective beam members 21 and 22 of the collision energy absorbing member 20 to reduce the space.

Hereinafter, the operation of the length-variable bumper in accordance with an exemplary embodiment of the present invention will be described with reference to the accompanying drawings.

FIGS. 4 and 5 show the length-variable bumper before operation. That is, when the vehicle is in a stop state or runs at a low speed, the length-variable bumper has a short length.

In the length-variable bumper having the short length, when the vehicle is accelerated to a predetermined speed or more, the motor 31 drives the screw 32. The screw 32 moves the linear member 33 forward depending on a rotational speed of the screw 32. The linear member 33 moves forward to push the connection member 34 connected to its side surface in parallel to widen the included angle.

The linear member 34 is connected to the collision energy absorbing member 20. As the linear member 34 moves forward, the connection member 34 pushes the folded collision energy absorbing member 20 to gradually unfold it. The linear member 34 is completely moved forward to be parallel to the collision energy absorbing member 20, and the connection member 34 is perpendicularly disposed between the linear member 33 and the collision energy absorbing member 20 to support them. FIGS. 1 and 3 show that the linear member 33 is completely moved forward and the connection member 34 completely unfolds the collision energy absorbing member 20 so that the length-variable bumper is maximally lengthened.

FIG. 6 is a plan view showing that collision occurs in an offset state in which the collision energy absorbing member 20 is unfolded. That is, when the length-variable bumper is maximally lengthened and a head-on collision occurs in the offset state, the collision energy absorbing member 20 in a collision state is deformed to absorb a certain amount of collision energy, minimizing collision energy transmitted to the vehicle body. Therefore, passengers can be safely protected from frequent offset collisions. In addition, in the case of the collision accident shown in FIG. 6, since the collision energy absorbing member 20, the bumper member 10, and the operation unit 30 can be repaired by changing only some components thereof, it is possible to reduce repair costs of the vehicle body.

When the vehicle running at the high speed as shown in FIGS. 1 and 3, in which the length-variable shock absorbing apparatus is maximally lengthened, is decelerated to a predetermined speed or less, the motor 31 drives the screw 32 in a reverse direction. The screw 32 driven in the reverse direction gradually moves the linear member 33 backward. At this time, the linear member 33 moves backward to pull the connection member 34 perpendicular to the linear member 33, and the collision energy absorbing member 20 connected to the connection member 34 is gradually folded. When the collision energy absorbing member 20 is completely folded, the length-variable shock absorbing apparatus for a vehicle is minimally shortened to reduce the length of the vehicle.

FIG. 7 shows that a collision occurs in an offset state when the collision energy absorbing member 20 is folded. If the front members 21a and 22a of the collision energy absorbing member 20 are longer than rear members 21b and 22b, even when they are completely folded, the front members 21a and 22a are not in contact with the rear members 21b and 22b to form a predetermined angle and thus a predetermined space. Even when the variable length is short as shown in FIG. 7, it is possible to obtain a certain space. In this case, while the collision energy absorbing member 20 is folded, collision energy can be absorbed by the obtained space even when another vehicle collides with the member 20 at a high speed. In addition, when the vehicle is damaged to an extent shown in FIG. 7, since some components of the length-variable bumper may be exchanged without repair of the vehicle body, repair costs can be reduced.

FIG. 8 shows a three-wheel single-seat vehicle on which the length-variable shock absorbing apparatus for a vehicle in accordance with an exemplary embodiment of the present invention is mounted. It is transparently illustrated that the length-variable shock absorbing apparatus for a vehicle is moved forward, and it is translucently illustrated that the length-variable shock absorbing apparatus for a vehicle is in a stop position or moved backward.

As can be seen from the foregoing, a length-variable shock absorbing apparatus for a vehicle in accordance with the present invention has the following effects.

The length of the vehicle can be varied depending on a vehicle speed to obtain a collision energy absorbing space upon collision at a high speed, making it possible to more safely protect a passenger, and the length of the vehicle can be reduced at a lower speed or upon stop to provide both driving performance and parking convenience.

Since the apparatus can be operated using a motor, not a hydraulic or pneumatic pressure, the apparatus is light and inexpensive, and can precisely control a length-variable bumper.

In addition, when accidents occur, the vehicle body can be less damaged to protect the engine, reducing repair costs.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A length-variable shock absorbing apparatus for a vehicle comprising:
    a bumper member disposed in the front of a vehicle and primarily absorbing collision energy upon collision;
    a collision energy absorbing member foldable in a longitudinal direction thereof, having one end connected to a frame of the vehicle and an other end connected to the bumper member, the collision energy absorbing member being made of a rigid and plastically deformable material and configured to be plastically deformed upon collision to secondarily absorb the collision energy; and
    an operation unit configured to transit the collision energy absorbing member to an unfolded state when a vehicle speed is a predetermined level or more and to transit the collision energy absorbing member to a folded state when the vehicle is the predetermined level or less,
    wherein the collision energy absorbing member has a front member coupled to the bumper member and a rear member coupled to the vehicle frame, the front member being longer than the rear member such that the front member and the rear member forms a predetermined angle to obtain a predetermined space between the bumper member and the frame when the collision energy absorbing member is folded, enhancing absorption of collision energy upon low speed collision.

2. The length-variable shock absorbing apparatus for a vehicle according to claim 1, wherein the collision energy absorbing member has grooves longitudinally disposed at predetermined intervals to be entirely collapsed upon collision.

3. The length-variable shock absorbing apparatus for a vehicle according to claim 1, wherein the collision energy absorbing member has a cross-sectional area of a portion connected to the bumper member smaller than that of a portion connected to the vehicle frame, and a linear surface with no step in a longitudinal direction thereof.

4. The length-variable shock absorbing apparatus for a vehicle according to claim 1, wherein the operation unit includes:
    a motor;
    a screw disposed at the vehicle frame in a longitudinal direction of the vehicle and driven by the motor;
    a linear member projecting from the vehicle frame or retracting toward the vehicle frame by the screw; and
    a connection member having one end connected to a side surface of the linear member and an other end connected to the collision energy absorbing member to push the collision energy absorbing member to be unfolded when the linear member projects and pull the colliding member absorbing member to be folded when the linear member retracts.

5. A vehicle having a length-variable shock absorbing apparatus comprising:
    a bumper member disposed in the front of a vehicle and primarily absorbing collision energy upon collision;
    a collision energy absorbing member foldable in a longitudinal direction thereof, having one end connected to a frame of the vehicle and an other end connected to the bumper member, the collision energy absorbing member being made of a rigid and plastically deformable material and configured to be plastically deformed upon collision to secondarily absorb the collision energy; and
    an operation unit configured to transit the collision energy absorbing member to an unfolded state when a vehicle speed is a predetermined level or more and to transit the collision energy absorbing member to a folded state when the vehicle is the predetermined level or less,
    wherein the collision energy absorbing member includes a front member coupled to the bumper member and a rear member coupled to the vehicle frame, the front member being longer than the rear member such that the front member and the rear member forms a predetermined angle to obtain a predetermined space between the bumper member and the frame when the collision energy absorbing member is folded, improving absorption of collision energy upon low speed collision.

6. The vehicle having the length-variable shock absorbing apparatus according to claim 5, wherein the collision energy absorbing member has grooves longitudinally disposed at predetermined intervals to be entirely collapsed upon collision.

7. A length-variable shock absorbing apparatus for a vehicle comprising:
    a bumper member disposed in the front of a vehicle and primarily absorbing collision energy upon collision;
    a collision energy absorbing member foldable in a longitudinal direction thereof, having one end connected to a frame of the vehicle and an other end connected to the bumper member, the collision energy absorbing member being made of a rigid and plastically deformable material and configured to be plastically deformed upon collision to secondarily absorb the collision energy; and
    an operation unit configured to transit the collision energy absorbing member to an unfolded state when a vehicle speed is a predetermined level or more and to transit the collision energy absorbing member to a folded state when the vehicle is the predetermined level or less,
    wherein the collision energy absorbing member includes a front member and a rear member, one end portion of the front member being hingably connected to the bumper member, an other end portion of the front member being hingably connected to one end portion of the rear member, and an other end portion of the rear member being connected to the frame of the vehicle.

8. The length-variable shock absorbing apparatus for a vehicle according to claim 7, wherein the front member being longer than the rear member such that the front member and the rear member forms a predetermined angle to obtain a predetermined space between the bumper member and the frame of the vehicle when the collision energy absorbing member is folded, enhancing absorption of collision energy upon low speed collision.

* * * * *